United States Patent
Dial, III et al.

(10) Patent No.: US 9,481,504 B2
(45) Date of Patent: Nov. 1, 2016

(54) PET TOY DISPENSER AND METHOD

(71) Applicant: Walter David Dial, III, Fayetteville, AR (US)

(72) Inventors: Walter David Dial, III, Rogers, AR (US); Christopher Andrew Scott, St. Charles, IL (US); Steven James Lipinski, Streamwood, IL (US)

(73) Assignee: Walter David Dial, III, Rogers, AR (US)

( * ) Notice: Subject to any disclaimer, the term of this patent is extended or adjusted under 35 U.S.C. 154(b) by 74 days.

(21) Appl. No.: 14/276,420

(22) Filed: May 13, 2014

(65) Prior Publication Data

US 2015/0332536 A1    Nov. 19, 2015

(51) Int. Cl.
*B65D 83/00* (2006.01)
*G07F 7/08* (2006.01)
*A01K 15/02* (2006.01)

(52) U.S. Cl.
CPC ............. *B65D 83/00* (2013.01); *A01K 15/025* (2013.01); *G07F 7/08* (2013.01)

(58) Field of Classification Search
CPC ........................... A61J 7/0084; A01K 5/0291
See application file for complete search history.

(56) References Cited

U.S. PATENT DOCUMENTS

| | | | |
|---|---|---|---|
| 5,078,097 A | 1/1992 | Chisholm | |
| 5,609,268 A * | 3/1997 | Shaw | A61J 7/0084 221/2 |
| 6,367,417 B1 | 4/2002 | Gal et al. | |
| 6,694,916 B1 | 2/2004 | Rucker et al. | |
| 7,219,620 B2 | 5/2007 | Rucker et al. | |
| 7,328,671 B2 | 2/2008 | Kates | |
| 7,380,518 B2 | 6/2008 | Kates | |
| 7,631,613 B2 | 12/2009 | Lescroart | |
| 8,386,074 B2 | 2/2013 | Smith, II et al. | |
| 8,397,948 B2 | 3/2013 | Mills et al. | |
| 2007/0068464 A1 | 3/2007 | Smith et al. | |
| 2007/0095297 A1 | 5/2007 | Boyd | |
| 2008/0036594 A1 | 2/2008 | Kates | |
| 2009/0071971 A1 * | 3/2009 | Johnston | A61J 7/0481 221/1 |
| 2009/0281656 A1 * | 11/2009 | Draper | G06F 19/3462 700/240 |
| 2012/0199650 A1 * | 8/2012 | Horst | G07F 17/0092 235/375 |
| 2012/0278228 A1 * | 11/2012 | Rubinstein | G07G 1/009 705/39 |
| 2013/0013106 A1 | 1/2013 | Carelli et al. | |

FOREIGN PATENT DOCUMENTS

WO    WO2004067479 A2    8/2004

* cited by examiner

*Primary Examiner* — Leslie A Nicholson, III
*Assistant Examiner* — Ayodeji Ojofeitimi
(74) *Attorney, Agent, or Firm* — Mark Murphey Henry; Joshua Hallenbeck

(57) ABSTRACT

A pet toy dispenser and method are provided. The dispenser has a housing, a dispenser mechanism, a drive mechanism, an electronic tag reader, and a controller. The drive mechanism is operable to move one or more of the plurality of compartments of the dispenser mechanism from a load location to an exit location. The electronic tag reader is capable of reading an electronic tag embedded in an animal toy within at least one compartment. The controller having an authentication function configured to determine whether a code of an electronic tag within the at least one compartment received from the tag reader corresponds to an authorized code and to allow the load completion of the compartment if the code is an authorized code.

7 Claims, 23 Drawing Sheets

PET TOY DISPENSER AND METHOD

FIELD OF THE INVENTION

This invention relates in general to pet toy dispensers.

BACKGROUND OF THE INVENTION

It is known that pets, such as dogs, are at times left in particular locations without human supervision. Such pets may be unattended for a period of time, within which, the pet might need to be fed. Further unattended pets may become bored and might proceed to do undesirable events that the unattended pet would not do if they were otherwise occupied.

U.S. Pat. No. 6,694,916 discloses a timed food-filled toy dispenser. However, the '916 patent does not disclose a device or method for controlling the toys that are placed into the dispenser or dispensed from the dispenser. The present inventors recognized that it would be desirable to provide a dispenser that allowed only authorized toys or items to be loaded and/or dispensed from the dispenser.

The present inventors recognized that loading items into a dispenser that are not designed for use with the dispenser or for play or consumption by an animal can be undesirable. The use of items that are not designed to be used with a dispenser, in some cases, can damage the dispenser. The present inventors recognized that the use of items that are not designed to be use with a dispenser might cause injury to the human user under certain circumstances. The use of items in a dispenser that are not designed for play or consumption by the target animal can result in injury to the animal.

SUMMARY OF THE INVENTION

A method of loading an animal toy dispenser is disclosed. An electronic tag reader detects whether an authorized animal toy is located within a first compartment of the dispensing wheel of an animal toy dispenser. The dispensing wheel is advanced so that a next compartment of the dispensing wheel is positioned at a load location if the electronic tag reader detects an authorized ID from an electronic tag of an animal toy within the first compartment.

A method of dispensing an animal toy from an animal toy dispenser is disclosed. An electronic tag reader detects whether an authorized animal toy is located within a first compartment of the animal toy dispenser adjacent the tag reader by listening for an ID from an electronic tag of an animal toy within the first compartment. The first compartment is moved to an exit opening in a housing of the dispenser to allow the authorized animal toy to exit the dispenser if the electronic tag reader detected an authorized ID from an electronic tag of an animal toy within the first compartment.

An animal toy dispenser is disclosed. The dispenser has a housing, a rotatable wheel, a motor, a contact-less electronic tag reader, and a controller. The rotatable wheel has a plurality of compartments. The motor is operatively connected to drive the rotatable wheel. The contact-less electronic tag reader is adjacent to a portion of the wheel. The reader is capable of reading an electronic tag embedded in an animal toy within at least one compartment of the wheel. The controller has an authentication function configured to determine whether a code of an electronic tag within the at least one compartment received from the tag reader corresponds to an authorized code and to allow the load completion of the compartment if the code is an authorized code.

Numerous other advantages and features of the present invention will become readily apparent from the following detailed description of the invention and the embodiments thereof, from the claims, and from the accompanying drawings.

DETAILED DESCRIPTION

Figure 1:
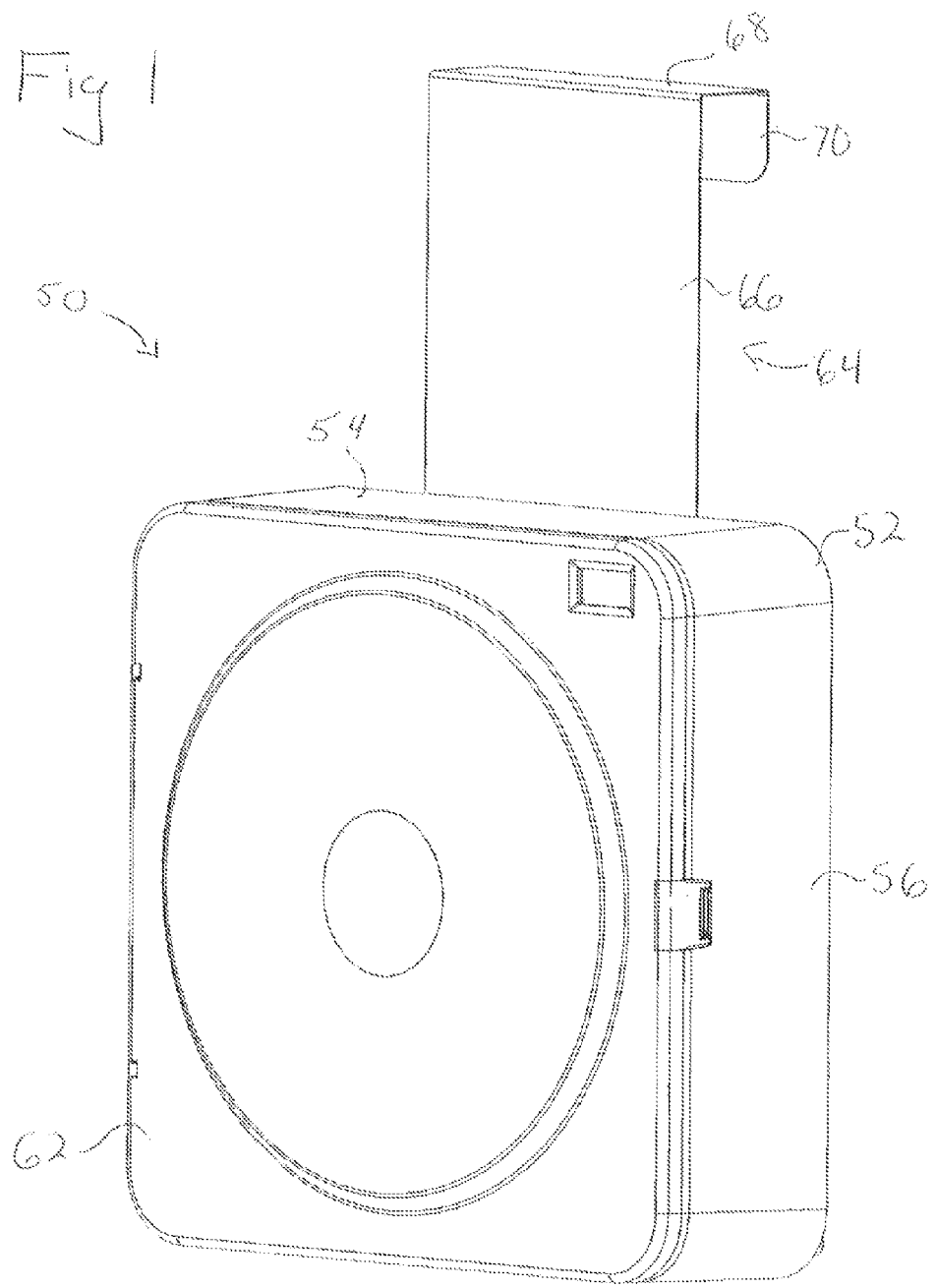
FIG. 1 is a front perspective view of one embodiment of the dispenser of the invention.
Figure 2:
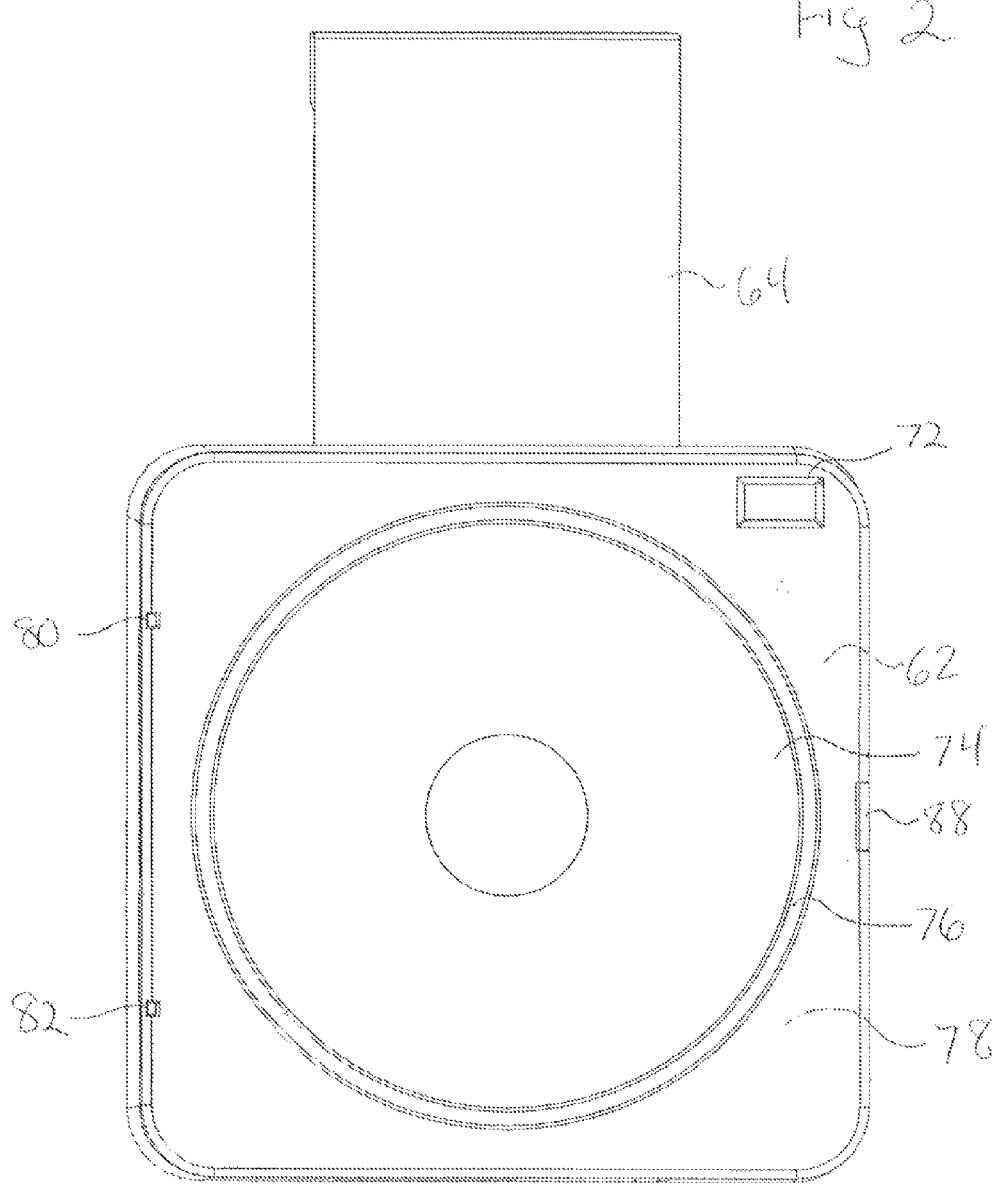
FIG. 2 is a front view of the dispenser of FIG. 1.
Figure 3:
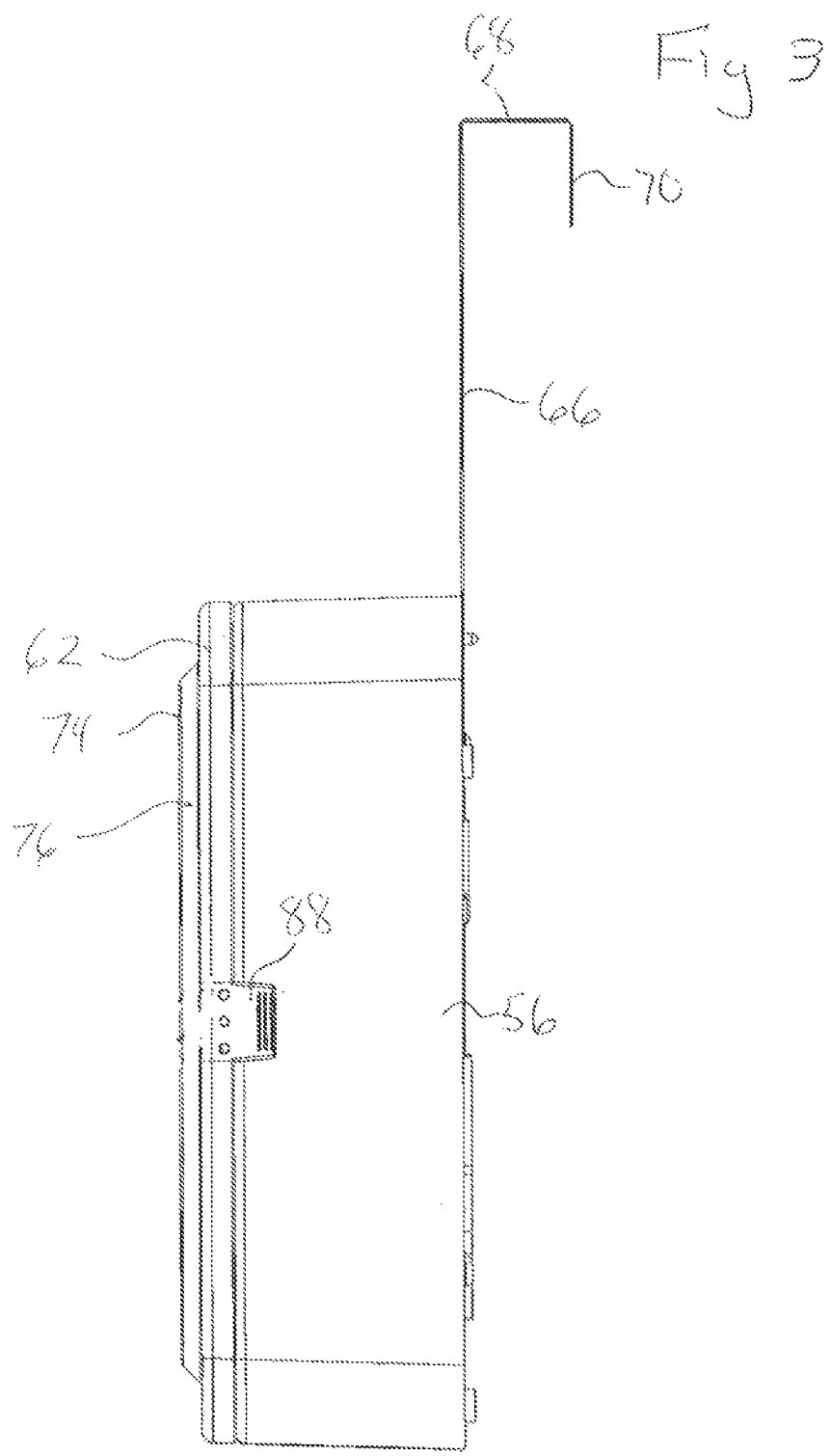
FIG. 3 is a right side view of the dispenser of FIG. 1.
Figure 4:
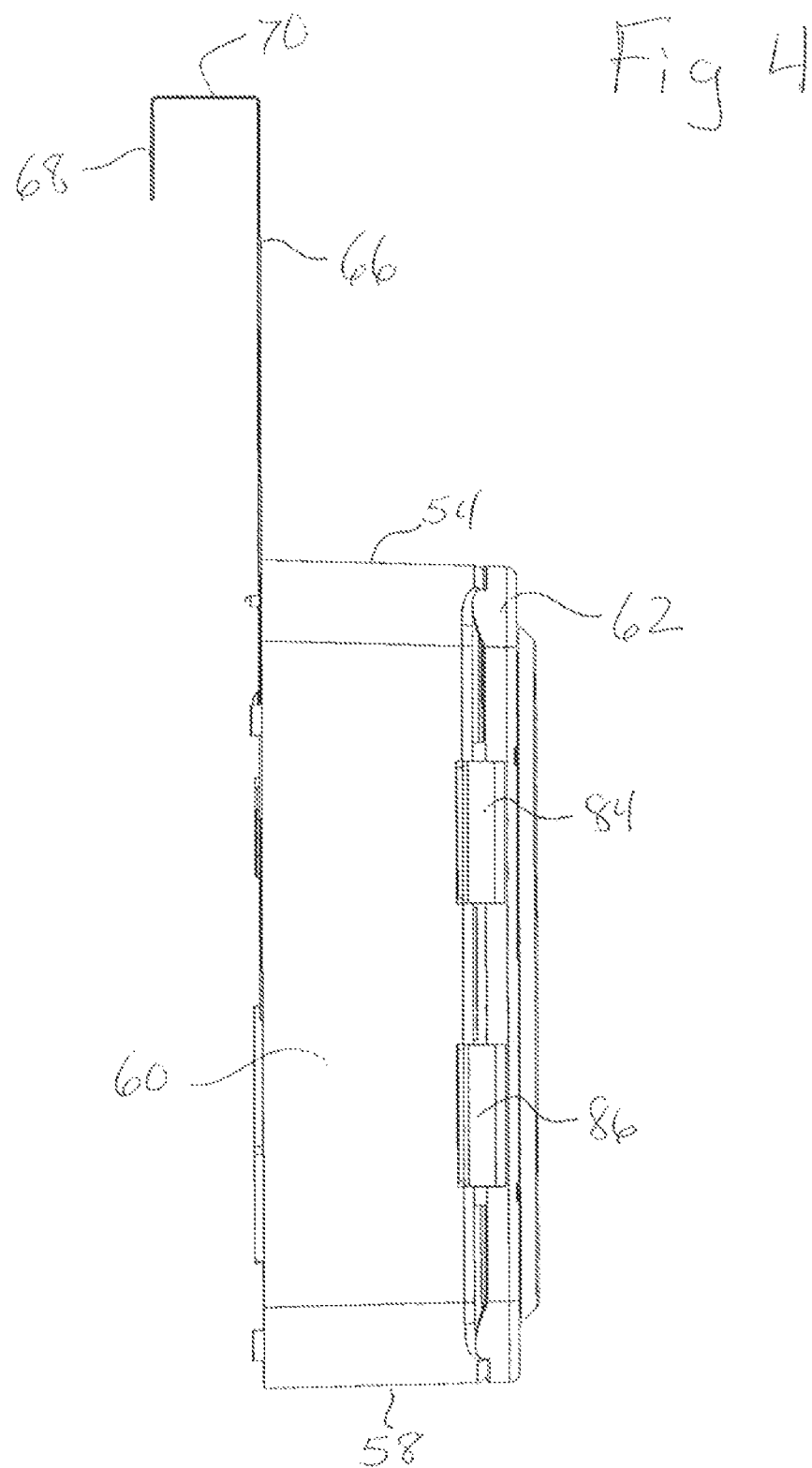
FIG. 4 is a left side view of the dispenser of FIG. 1.

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 5:
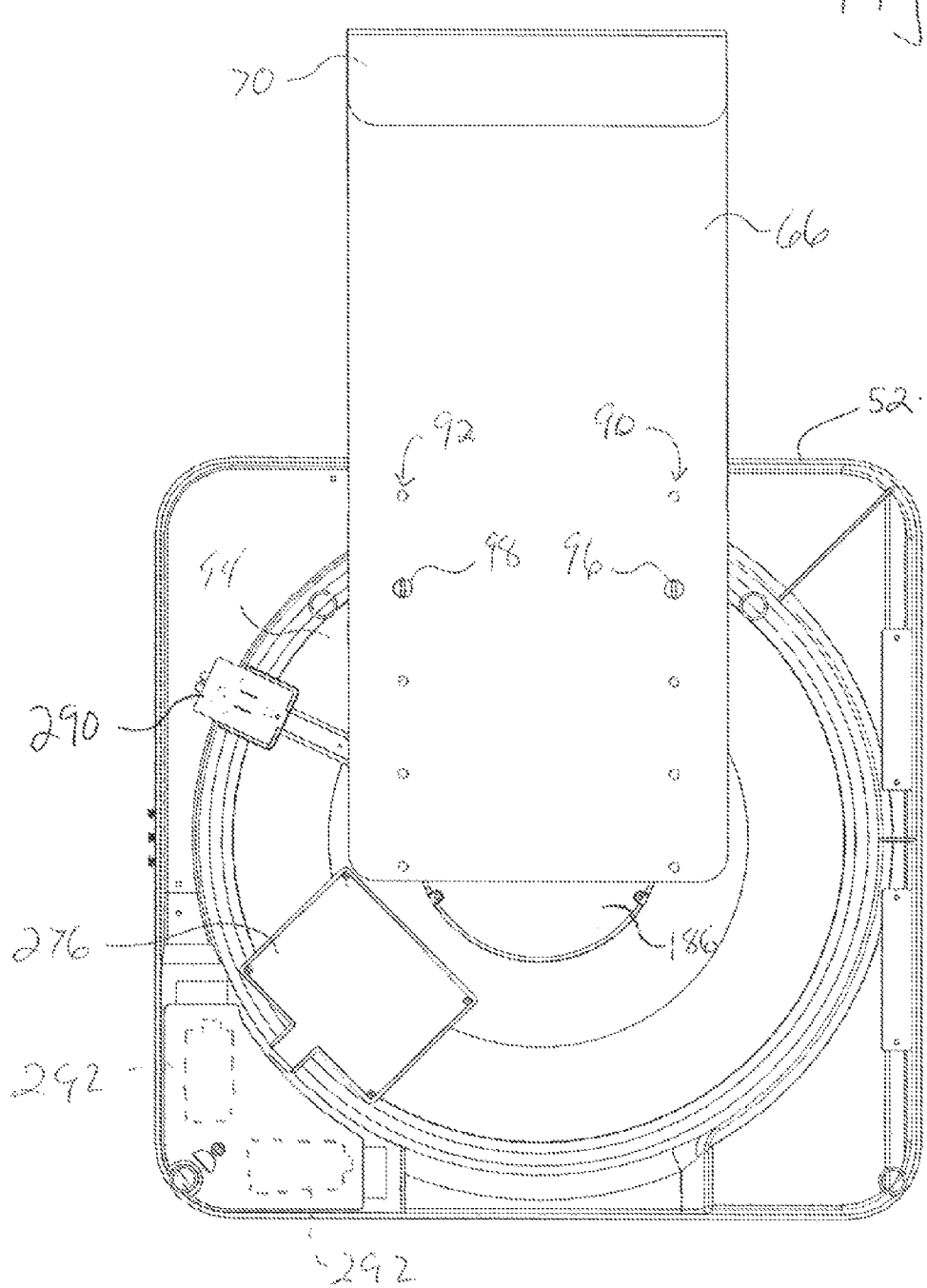
FIG. 5 is a rear view of the dispenser of FIG. 1.
Figure 6:
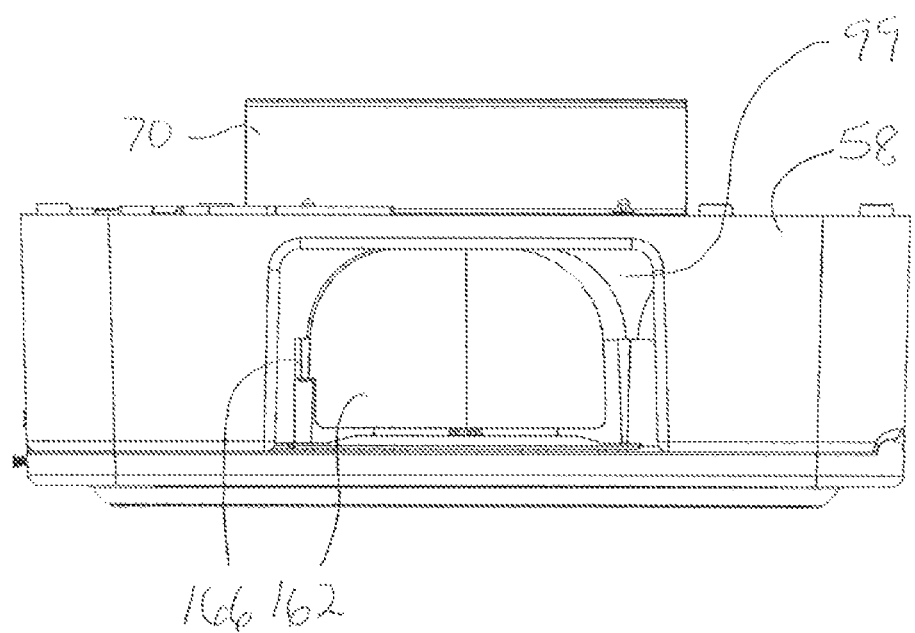
FIG. 6 is a bottom view of the dispenser of FIG. 1.

FIGS. 1-6 show a dispenser 50 having a housing 52 and a hanger mount 64. The housing has a top wall 54, a right side wall 56, a bottom wall 58, and a left side wall 60. The housing has a cover 62. The hanger mount 64 has a first point 66, a second portion 68, and a third portion 70. The hanger mount 64 allows the dispenser to be hung over the top of a door or other suitable support. As shown in FIG. 6, the bottom wall 58 of the housing has an exit opening 99.

The cover 62 has a display opening 72, a raised circular portion 74, and a ramp 76 connecting outer portions 78 to the raised circular portion 74. A left side of the cover has hinge openings 80, 82 for connecting to hinges 84, 86. A right side of the cover has a latch 88.

The mount 64 is attached to a back portion 94 of the housing 52 with two spaced apart fasteners, such as screws 96, 98. The screws are placed through a pair of holes in the hole rows 90, 92. The hole rows allow the user to select the relative height or position of the housing when mounted with the mount 64, which the housing should be placed, by picking a higher or lower set of holes.

Figure 7:
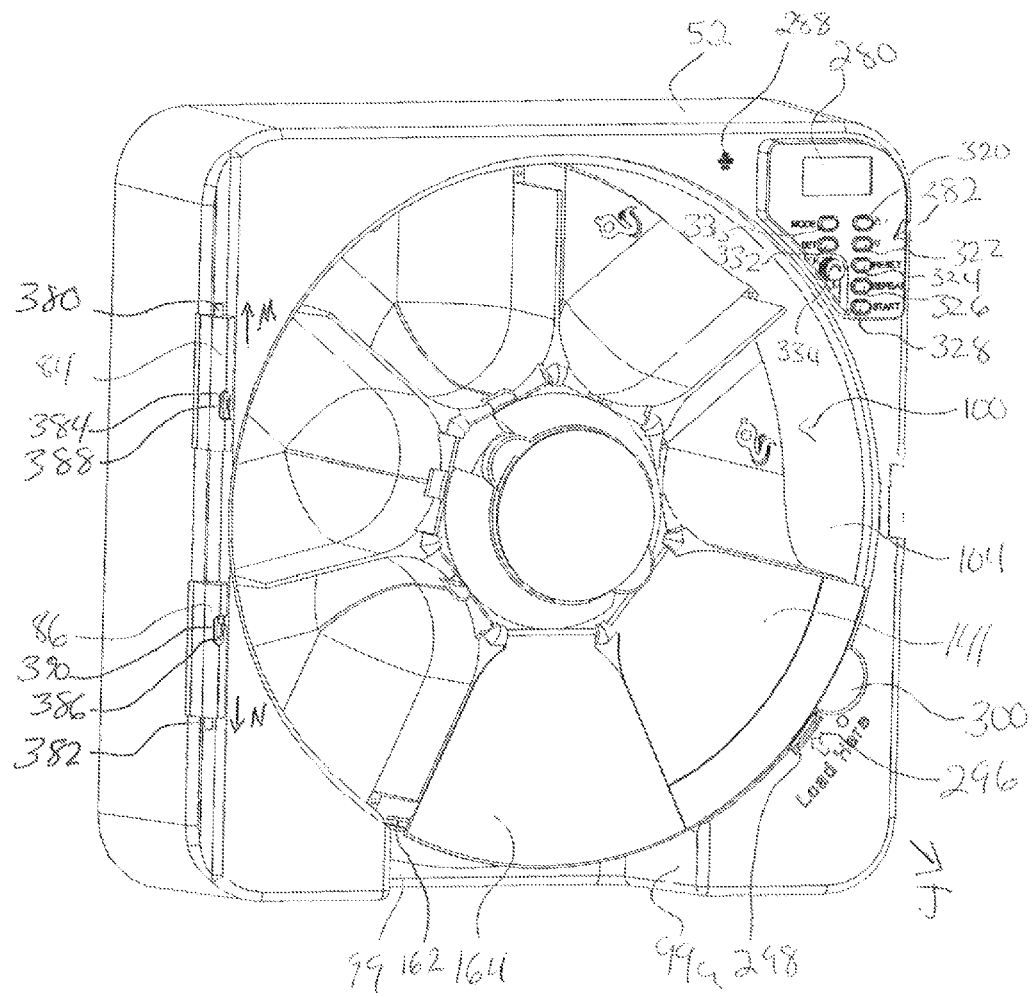
FIG. 7 is a front perspective view of the dispenser of FIG. 1 with a cover removed.

FIG. 7, shows the dispenser with the cover removed. The dispenser has a carousel 100. The carousel is mounted to rotate within a circular recess 102.

Figure 8:
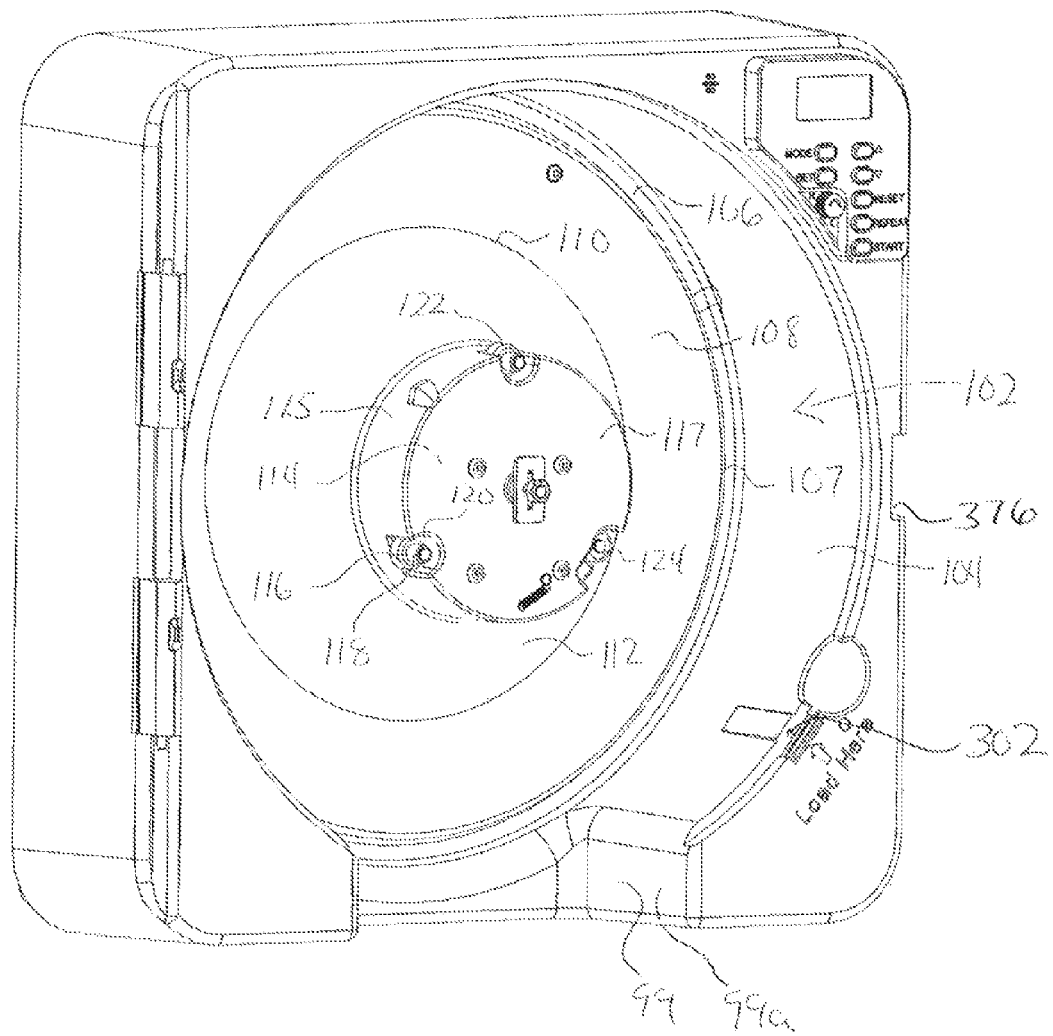
FIG. 8 is a front perspective view of the dispenser of FIG. 1 with a carousel and cover removed.

As shown in FIG. 8, the circular recess 102 has a side wall 104 interrupted by the exit opening 99. The recess 102 has an outer ring 106, an outer ridge 107, a main ring 108, a valley 110, a cone area 112, and a central housing hub 114. The central housing hub 114 has a face 117 and a side wall 115. The outer ring 106 is recessed from the outer ridge 107. The main ring 108 is recessed below the outer ring 106 adjacent the valley 110. The valley 110 is the lowest portion in the recess 102. The cone area 112 rises from the valley 110 to meet the sidewall 115 of the hub 114.

Carousel rollers 116, 122, 124 are spaced equidistant about the perimeter of the hub 114. Rollers 116, 122, 124 are identical and identically mounted, and therefore only roller 116 will be described. A recess 120 is recessed from both the face 117 and the sidewall 115. A post 118 is located within the recess. The roller 116 is mounted to rotate about the post and partially within the recess. The roller 116 extends beyond the edge of the sidewall 115 to engage the underside of the carousel and to space the carousel from the sidewall 115. The carousel rollers reduce friction and facilitate the rotation of the carousel about the hub 114.

Figure 9:
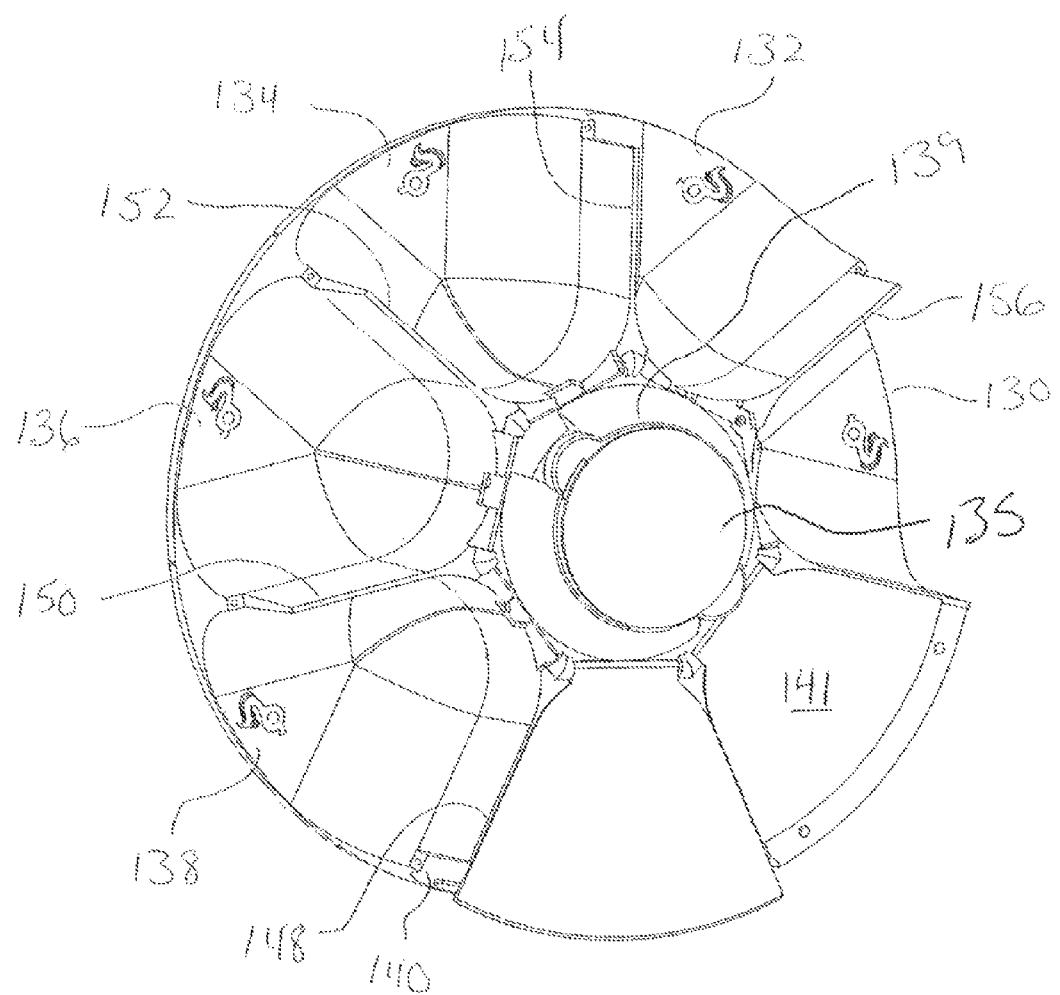
FIG. 9 is a front perspective view of the carousel of the dispenser of FIG. 1.

As shown in FIGS. 7 and 9, the carousel has a number of compartments 130, 132, 134, 136, 138, 140, and a wedge portion 141 spaced about a carousel hub 139. In some embodiments, the wedge portion is a compartment. Each compartment is the same so only compartment 140 will be described. Compartment 140 has a floor 142, a lower curved portion 144, and an upper curved portion 146. A portion of the upper curved portion comprises one or more dividing walls 148. Other dividing walls 150, 152, 154, 156 are shown in FIG. 9. The compartment 140 is wider at an exit end 158 than at an interior end 160 adjacent the hub 139.

Figure 10:
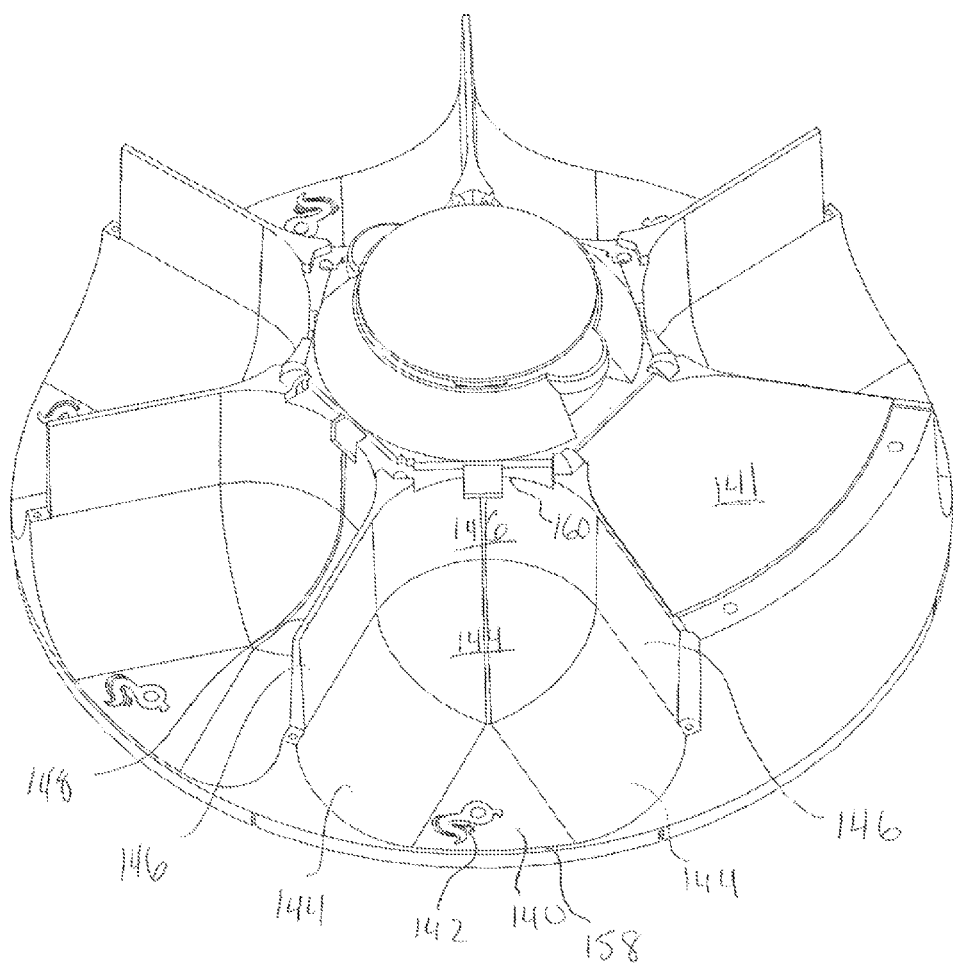
FIG. 10 is a front perspective view of the carousel.

The compartment 140 has an exit door 162 and a load door 164. Compartments 130, 132, 134, 136, 138 also have exit and load doors, but they are not shown in the drawings. The exit door has a hinge 166 located on the left side of the exit door. The hinge is pivotally mounted on a shaft 168 extending from a shaft platform 170 recessed from an end of the upper curved portion 146. The exit door is held in a closed position by the side wall 104 of the recess 102 until the exit door is rotated to the exit opening 99. When the exit door reaches the exit opening 99, gravity and the weight of any item in the compartment 140 cause the door to rotate about the shaft 168 in the direction A of FIG. 11 until the exit door makes contact with a right wall 99a of the exit opening 99 or until gravity resists further downward motion. The opening of the exit door allows the contents of the compartment 140 to fall out by gravity through the exit opening 99 and out of the dispenser. When the carousel is rotationally advanced counterclockwise in the direction C of FIG. 10, contact between the exit door and the right wall 99a of the exit opening 99 and an adjacent portion of the side wall 104 causes the exit door to swing closed in the direction B. Once the exit door is past the exit opening, the side wall 104 keeps the exit door in the closed position.

The exit door prevents contact between a dispensable item that is within the compartment 140 and the sidewall 104 of the housing. Without the exit door excessive friction or drag might be created between the dispensable item and the sidewall if the dispensable item came in contact with the sidewall during rotation or otherwise. The exit door prevents damage to the dispensable item and to the side wall. The exit door prevents excessive load on the motor due to friction between the dispensable item and the side wall.

Figure 11:
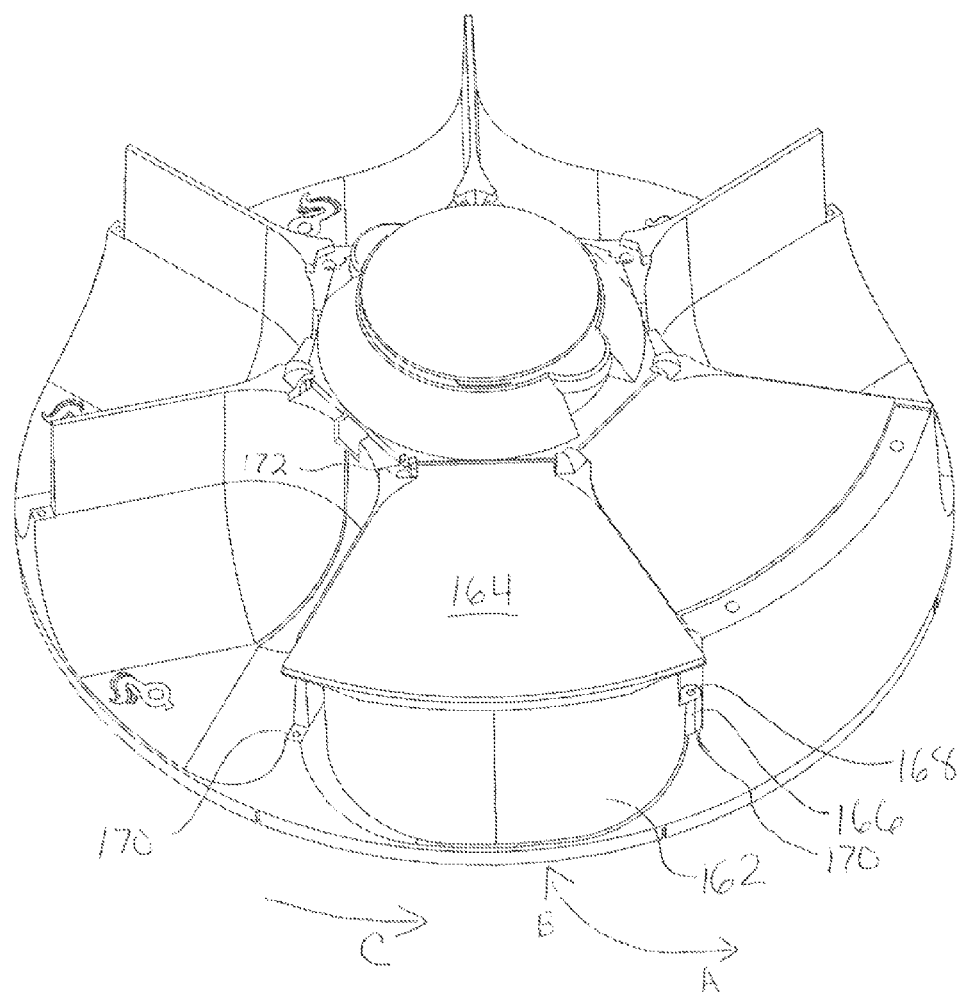
FIG. 11 is another front perspective view of the carousel.
Figure 12:
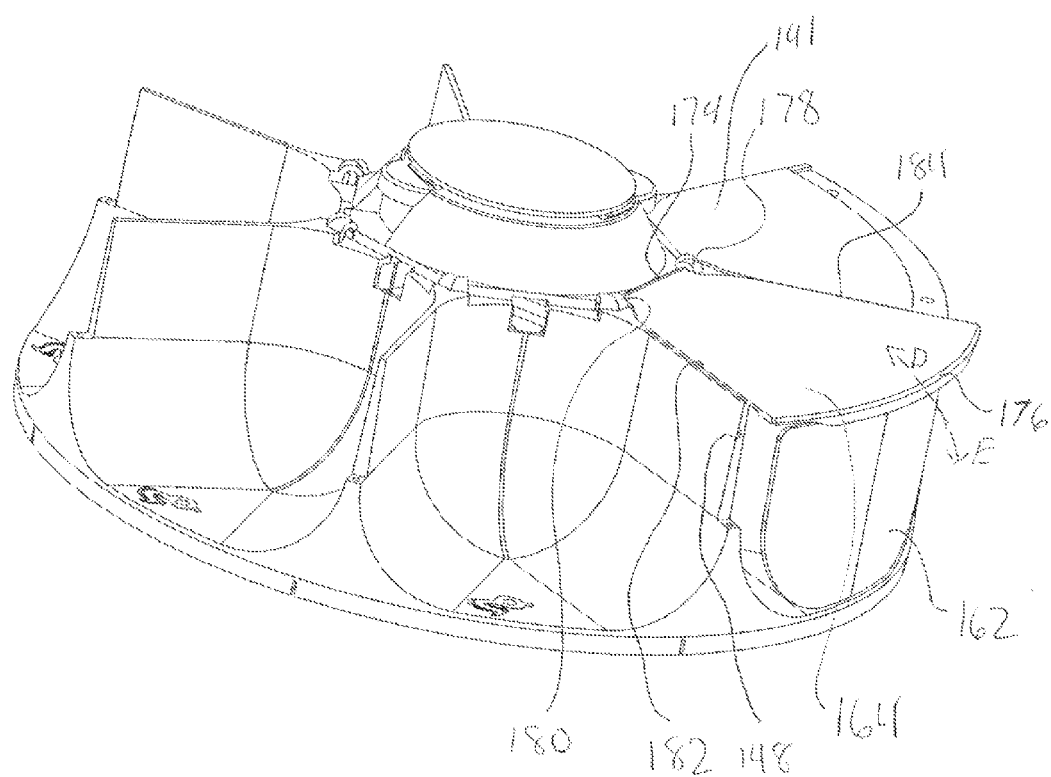
FIG. 12 is a rotated front perspective view of the carousel.

The load door 164 has a hub end 174 and a far end 176. At the hub end, two pivot nubs 172 (right side not shown) are pivotally received in journals 180, 178 on opposite sides of the load door at the hub end. The load door 164 has a closed position where a portion of the opposite edges 182, 184 rest on opposite dividing walls 148 of the compartment or on one dividing wall and a portion of the wedge 141, as shown in FIG. 11. The load door has one or more raised positions where the portion of the opposite edges 182, 184 are spaced apart from the opposite dividing walls 148 of the compartment or from one dividing wall and a portion of the wedge 141, so that access is provided to the compartment from the front side of the carousel. The load door is pivotal about the pivot hubs between the open and closed position.

A drive mechanism 188 is mounted in a drive housing 190 (the upper half of the housing is not shown). The housing 190 is placed within a hub recess on the back side of the dispenser, which is covered by a cover 186. The housing 190 is mounted to an inside surface of the hub recess on the back side with fasteners extending between the hub recess and a drive mechanism mounting plate 192. The drive mechanism mounting plate is fixed to the housing 190.

Figure 13:
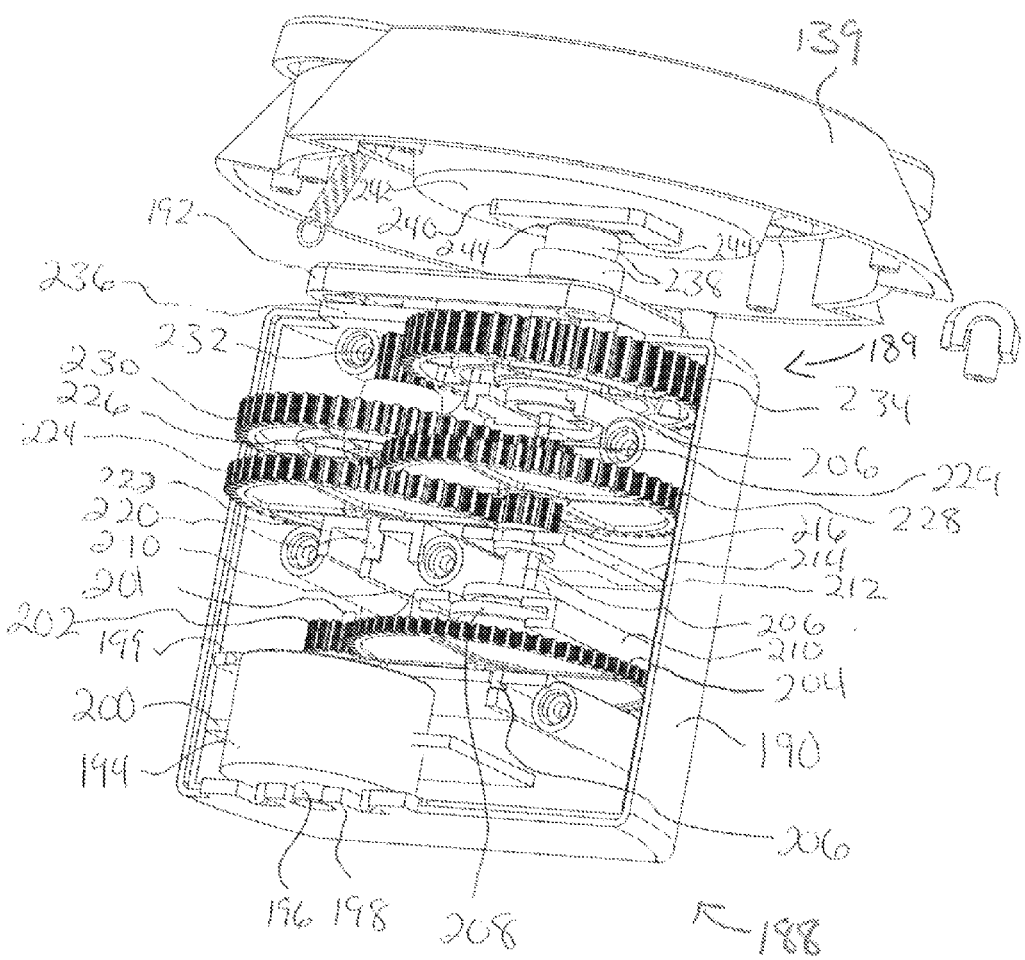
FIG. 13 is a top perspective view of the drive mechanism and a hub of the dispenser of FIG. 1.

A motor 194 is mounted to the housing 190 as shown in FIG. 13. The motor can be an electric motor. A bottom portion of the housing is shown. A rear nub 196 connects the motor 194 to a recess in the back wall 198 of the housing. Motor has a center stabilizing support member 200. The output shaft 201 is journaled to rotate in a front motor support 199. The output shaft drives the gearing 189. A drive gear 202 is fixed to the output shaft 201. The drive gear 202 is enmeshed with a first driven gear 204. The first driven gear is fixed to a first drive shaft 206. Downstream from the first driven gear 204 is a stabilizer 208 fixed to the first drive shaft and supported to rotate within stabilizer supports 210. Downstream from the stabilizer, the first drive shaft 206 is journaled to rotate a second stabilizer 212 in a second stabilizer support 214. Downstream from the second stabilizer a second gear 216 is fixed to the first drive shaft. The second gear 216 is enmeshed with a third gear 224. The third gear 224 is fixed to a second drive shaft 220. The second drive shaft is supported at a first end by first end supports 222 and at a second end by journaling within the front wall 236 of the housing 190.

Downstream from the third gear 224 is a forth gear 226 fixed to the second drive shaft. The forth gear 226 is enmeshed with a gear fifth gear 228. The fifth gear is fixed to the first drive shaft. Downstream from the fifth gear 228 is the sixth gear 229 fixed to the first drive shaft. The sixth gear 229 is enmeshed with a seventh gear 230, which is fixed to the second drive shaft. Downstream from the seventh gear 230 is the eighth gear 232, which is fixed to the second drive shaft. The eighth gear 232 is enmeshed with the ninth gear 234, which is fixed to the first drive shaft. The first drive shaft then extends through the front wall 236 of the housing. Two spacers 238 are located on the first drive shaft between the drive mechanism mounting plate 192 and the key plate 240. The key plate is fixed to a back 242 of the hub 139. The key plate has a key slot 244 for receiving a lock bar 246.

The lock bar extends transversely through a hole (not shown) in the first drive shaft 206 adjacent a threaded end portion 248 of the first drive shaft. A recessed face 250 opposite the back 242 of the hub 139 also has a key slot 252.

Figure 14:
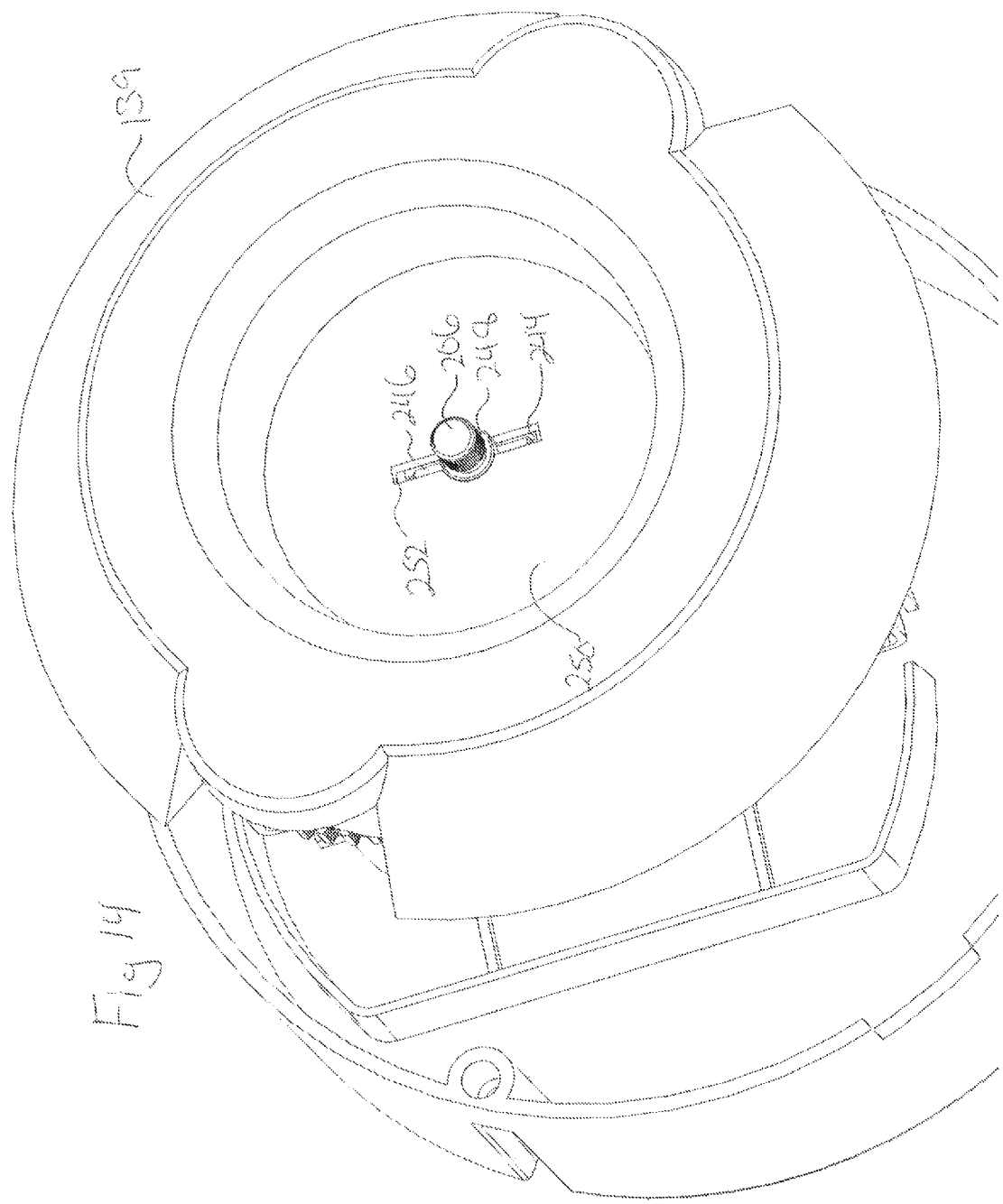
FIG. 14 is a front perspective view of the hub of the dispenser of FIG. 1.
Figure 15:
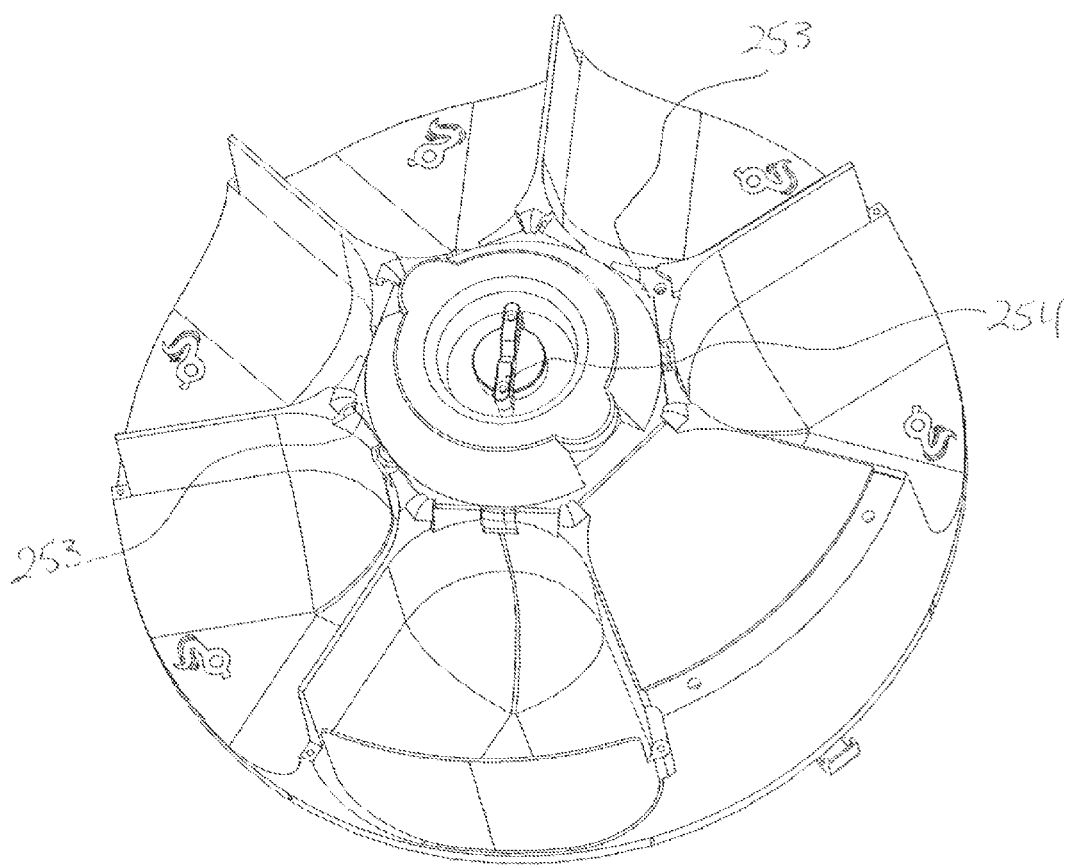
FIG. 15 is a front perspective view of the carousel.
Figure 16:
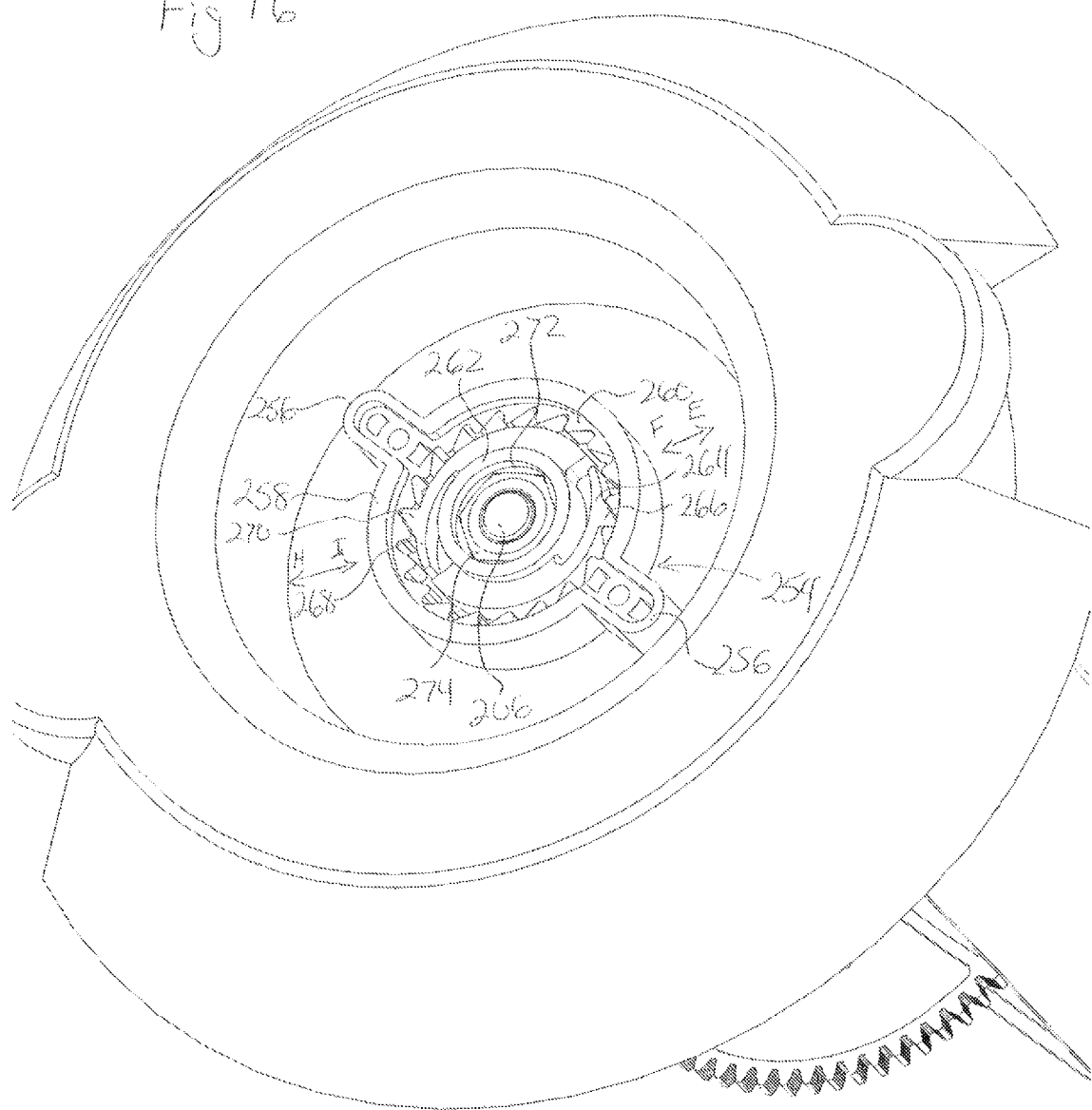
FIG. 16 is a front perspective view of the hub of the dispenser of FIG. 1.

FIGS. 14-16 show the hub 139 with the hub front cover 135 removed. The hub 139 is fixed to a center portion 253 of the carousel 100 by fasteners (not shown). The hub 139 and carousel are secured on the first drive shaft by a fly nut 254. FIG. 16 shows the upper cover portion of the fly nut 254 is removed to show the interior of the fly nut. The fly nut comprises perimeter wall 258 having two opposite wings 256. Fixed to the perimeter wall is an outer tooth ring 260. An inner ring 262 has flexible arm members 264, 268 connected to engaging teeth 266, 270, respectively. The interior of the inner ring 262 has a socket shape portion 272 configured to receive and engage the nut 274.

The fly nut prevents over tightening. When rotating the fly nut in the counterclockwise direction, the outer tooth ring will engage with the engaging teeth 266, 270 to cause the socket shape portion to loosen the nut 274 from the first drive shaft 206. When rotating the fly nut in the clockwise direction, the outer tooth ring will engage with the engaging teeth 266, 270 to cause the socket shape portion to tighten the nut 274, until the rotation resistance/friction of the nut exceeds the outward (Direction E and H of FIG. 16) biased force of the flexible arm members 264, 268. When this occurs the rotation resistance of the nut will prevent the nut from further rotation and the flexible arm members 264, 268 will be driven inward (direction F and I) so that the outer tooth ring will slip over each of the engaging teeth 266, 270 and no further tightening of the nut will occur.

The rotation of the motor 194 will direct the first driven shaft to rotate via the gearing. This will cause the lock bar 246 to rotate. The key will engage the key slot and drive the hub 139 and the carousel 100 to rotate, while the housing 52 remains stationary.

Figure 17:
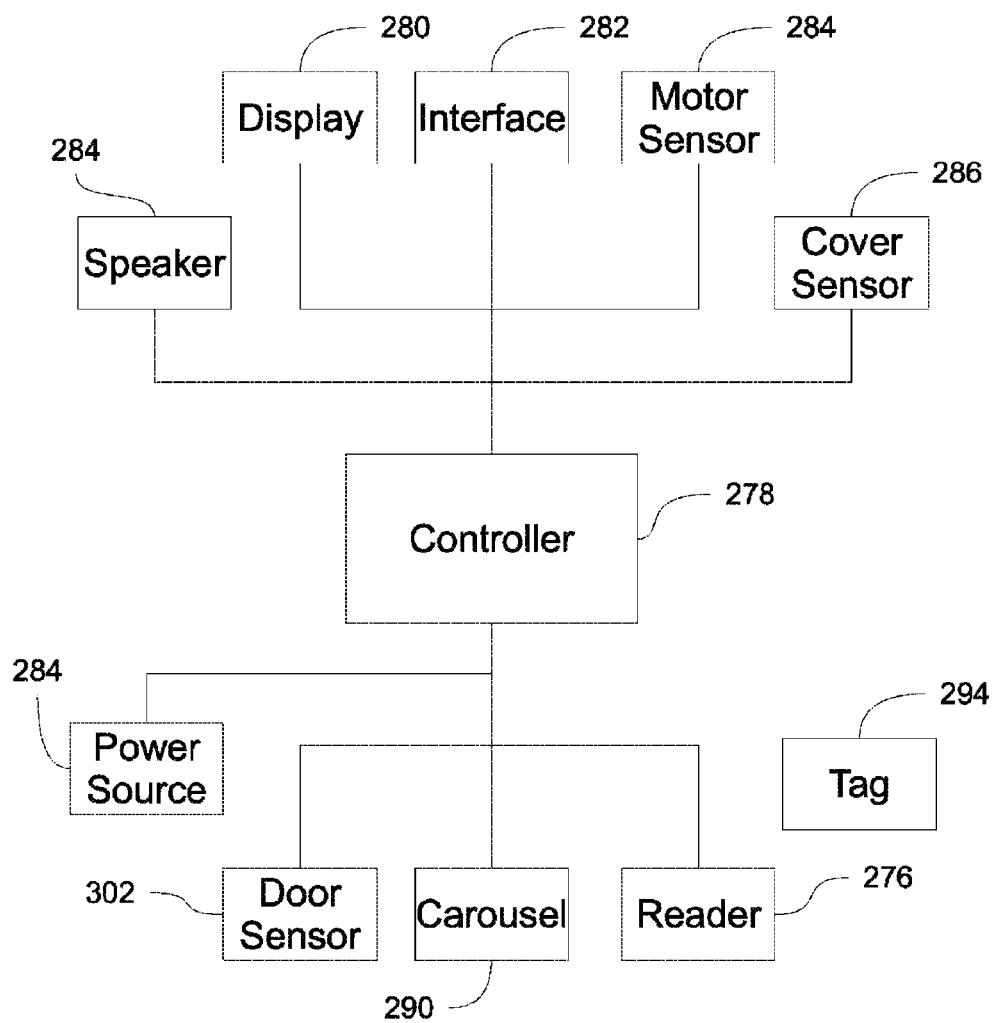
FIG. 17 is a schematic diagram of certain components of the dispenser of FIG. 1.
Figure 18:
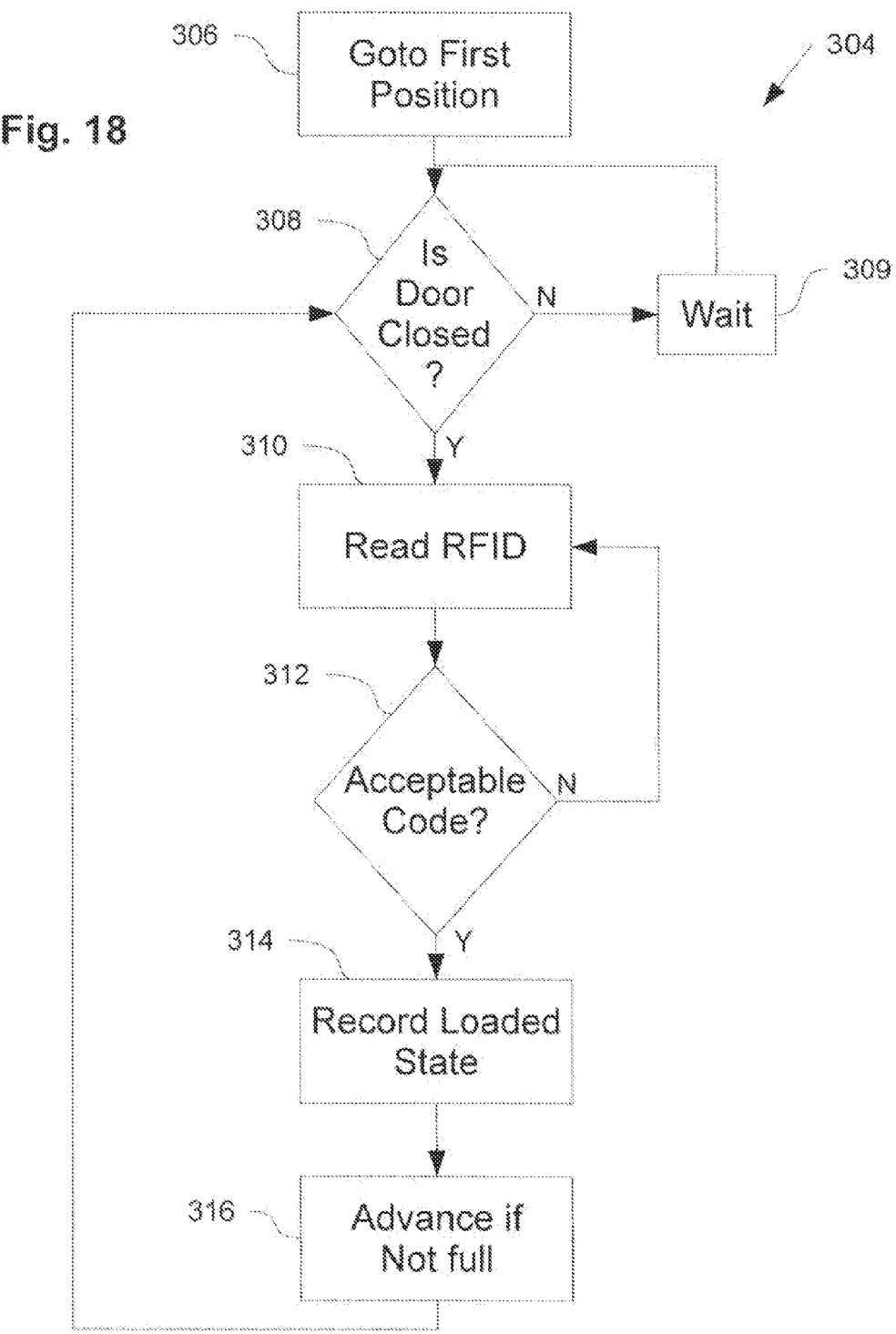
FIG. 18 is a flow diagram of a load function of the dispenser of FIG. 1.

As shown in FIG. 17, the dispenser has a controller 278. The controller is signal connected, by wired or wireless communication, to a Radio Frequency Identification (RFID) reader 276, a display 280, a user interface 282, a motor position sensor 284, a speaker 288, a carousel position sensor 290, a cover sensor 286, a power source such as batteries 292, and a load door sensor 302. The user interface 282 comprises an up button 320, a down button 322, a reset button 324, a repeat button 326, a start button 328, a mode button 330, a set button 332, and a volume knob 334.

The cover sensor 286 can be a compression switch that is located at a place on the housing that the cover comes in contact or close proximity with when the cover is closed. The cover then can compress the compression switch when the cover is closed. The controller can determine whether the cover is closed by reading whether the compression switch reports a compressed position.

In some embodiments, the controller knows the position of the carousel by information from the carousel position sensor 290. The carousel position sensor 290 is mounted to the housing and reads a corresponding plurality of electronic tags attached to the carousel at each compartment. Therefore the sensor can allow the controller to determine the position of the carousel based on the direction of rotation and the last read tag. In some embodiments, the controller knows the position of the carousel by information from the motor position sensor 284. The motor position sensor may detect the number and position of the output shaft of the motor to determine how many times the shaft has rotated and then can calculate the position of the carousel by a formula considering the gear ration of the gearing 189.

The controller 278 may be an application-specific integrated circuit (ASIC) having one or more processors and memory blocks including ROM, RAM, EEPROM, Flash, or the like; a programmed computer having a microprocessor, microcontroller, or other processor, a memory, and an input/output device; a programmable integrated electronic circuit; a programmable logic controller or device; or the like. Any device or combination of devices on which a finite state machine capable of implementing the procedures described herein can be used as the controller 278.

The RFID reader is configured to read RFID tags, such as RFID tag 294. The tags can be passive, active, or battery-assisted passive. Passive tags are not battery powered. Active tags are battery powered and periodically transmit an ID signal. Battery-assisted passive tags require less power because the only actively send an ID signal when in the presents of a RFID reader. The RFID tags 294 can be provided with a factory designated ID signal. In some embodiments, the RFID tags can be re-programmed to have a designated ID signal. The RFID tags may comprise an intergraded circuit for storing and processing information, for collecting DC power from the reader signal, and for receiving and transmitting a signal via an antenna. In some embodiments, the RFID tags have a programmed or programmable data processor for processing the transmission and sensor data.

The RFID reader 276 can be a passive or active reader. When the RFID reader is an active reader it transmits interrogator signals to detect a RFID tag within a reception range of the RFID reader. In some embodiments, the reception range can be adjusted, for example, so that it will only detect tags within the compartment of the carousel immediately above the reader 276. The RFID reader may have an integrated circuit or a programmed or programmable data processor for transmitting an interrogator signal, detecting responses or tags within range, among other processes. One feature of RFID system is that the tag does not need to come into physical contact with the reader in order for the reader to read the tag. In this way the reader is a contact-less reader. It will be recognized that while reference is made to RFID, other forms and protocols of wireless communications capable of detecting an authorized code or ID of a tag is present at a location can be used.

The dispenser has a load function 304 for loading one or more dispensable items 350 into the compartments. Each dispensable item is embedded with an RFID tag 294. In one embodiment of the load function, the each compartment of the carousel is empty. The controller, at step 306, instructs the carousel to rotate counterclockwise until the wedge 141 is positioned at the exit opening 99 and compartment 140 is positioned or centered at the load location 296. Then the user presses a latch 298 at the load location in the direction J to overcome the spring biasing the latch in the opposite direction. With the latch retracted, the user places one or more fingers in the load door recess 300 in the housing adjacent the load location, and lifts the load door of compartment 140 upward and towards the hub in the direction D. Then the user places a dispensable item in the compartment 140.

The user lowers the load door down in the direction E, and presses the door down until the latch 298 retracts and then overlays a portion of the load door to retain the load door in the closed position over an underlying load door sensor 302.

The load door sensor 302 is spring biased to a raised position. When pressed downward to a depressed position by a load door, the load door sensor provides a signal to the controller that the corresponding load door is closed.

When the controller detects that the load door is closed, at step 308, the controller reads the signal from the RFID reader at step 310. If the door is detected to be open, then the controller will wait a predefined amount of time at step 309 and then will proceed to check again at step 308.

At step 312, if the RFID reader (1) does not report any detected RFID tag or (2) reports an unrecognized tag, then the controller will not advance the carousel and will continue to poll RFID reader, at step 310, and wait until the RFID reader reports reading an acceptable signal or code from an authorized RFID TAG. The acceptable signal or code can be pre-programmed into the controller. This dispensable item authentication ensures that only authorized dispensable items having acceptable signals or codes can be used with the dispenser. When the RFID reader does not detect or report an acceptable signal or code within its reading range, the controller will not advance to allow the loading of any additional compartments. If an acceptable signal or code is read by the RFID reader, then, at step 314, the controller will record in its memory that compartment 140 is loaded. FIG. 5 shows that the RFID reader 276 is positioned behind the carousel so that it will read the contents of compartments located at the loading location 296.

At step 316, when loading is completed by detecting an authorized ID, the controller will instruct the motor to rotate the carousel in the counterclockwise direction until compartment 138 is located at the loading location 296, as long as the carousel is not full. Then the controller will return to step 308 and repeat the process until all compartments, such as 138, 136, 134, 132, and 130, are loaded or until the user instructs through the user interface that no more compartments are to be loaded and the dispenser should operate with less than all compartments loaded.

If when a compartment arrives at the load location, during the operation of the load function the controller detects an acceptable signal or code from the RFID reader, the controller will either not stop, or will advance the carousel after a brief stop, to the next empty compartment. In some embodiments, the controller will check its memory to see determine whether a compartment is loaded, and should be skipped, rather than reading the signal from the RFID reader.

The controller has a mode select function. The mode select function allows the user to select a mode by pressing the mode button 330. At least two modes are available, a set interval mode, and a set time mode. The set interval mode allows the dispenser to dispense at regular intervals, such as every predefined number of minutes or every predefined number of hours. One example provides that interval dispensing will occur every hour. Another example provides that interval dispensing will occur every two hours. Numerous other intervals can be predefined or user entered by using the up and down arrows to cycle to the desired minute and/or hour interval.

The set time mode allows the user to set the times of day when each dispensation will occur. If the dispenser has six compartments, then the user would be able to set six different times during the day when the dispensation will occur. The set times can be in the AM or PM and can be set down to the minute. The user can select the set button when the set-time mode is displayed on the display. The set-time mode can be displayed by pressing the mode button, repeatedly if necessary to cycle the options, until the set-time mode is displayed.

Each dispensation can be set by selecting AM or PM with the up or down buttons 320, 322, then pressing set once the desired AM or PM is shown on the display, then selecting the desired hour of dispensation with the up or down buttons 320, 322, then pressing set once the desired hour is shown on the display, then selecting the desired minute of dispensation with the up or down buttons 320, 322, and then pressing set once the desired minute is shown on the display. This process can be repeated for each of the available dispensation time slots, such as six time slots if there are six compartments. Each dispensation time will be saved in the controller's memory.

When the desired mode has been selected and set, the dispensation function can be started by selecting the start button.

The controller has a reset function that will clear all or some of the set-time mode dispensation time slots when the user presses the reset button 324. The controller has a repeat function that will repeat the immediately last set-time mode setting. Therefore if a user had previously set 8 am, 10 am, 12 pm, 2 pm, 4 pm, and 6 pm times as dispensation times, and had previously ran the dispenser to dispense at those times, then the next day the user need not reprogram those times, but can select the repeat button to re-rerun that schedule after the dispenser has been reloaded with dispensable items. Therefore the schedule can be entered once and re-run on successive days using the repeat button.

The controller has a clock function that maintains the current time once initially set by the user through a set current time function. In some embodiments, the controller has a date function that maintains the date time once the date and time have been set through a set current date and time function.

Figure 19:
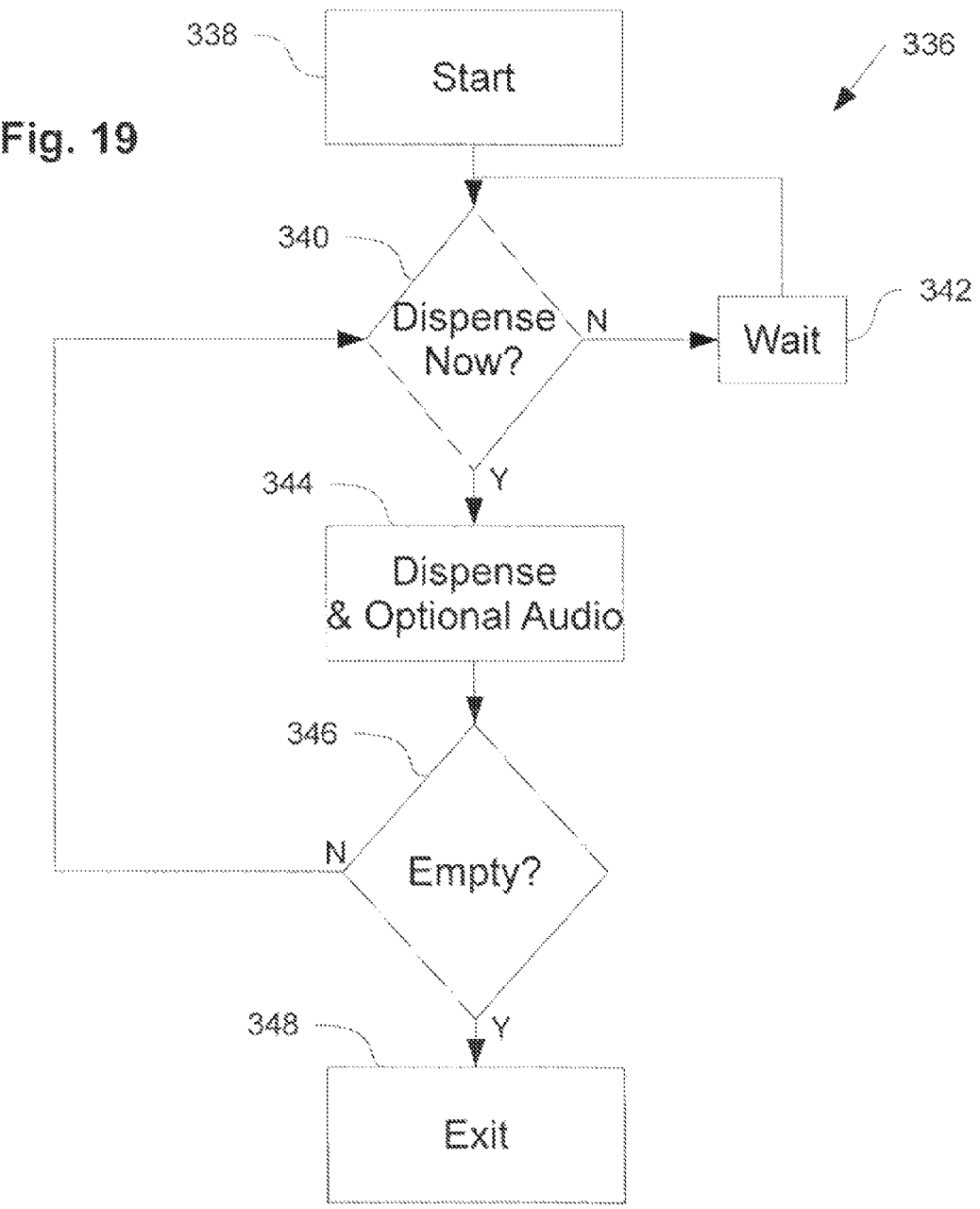
FIG. 19 is a flow diagram of a dispense function of the dispenser of FIG. 1.

The controller has a dispense function 336, as shown in FIG. 19. The dispense function is started, at step 338, when the user selects the start button 328 or the repeat button 324. The function checks, at step 340, whether the memory provides that a dispense event should occur at the present time. The controller therefore, compares the present time to the dispense times in the memory and if a match is found, then the controller will proceed to step 344, otherwise the controller will proceed to step 342 and wait a predefined amount of time before returning to step 340 to check again.

At step 344, the controller will instruct the motor 194 to rotate the carousel so that the next compartment is moved to the exit opening 99. When the compartment reaches the exit opening the weight of the dispensable item in the compartment and gravity will cause the exit door to open and the dispensable item will fall out of the compartment, through the exit opening and out of the dispenser. The controller will update its memory to recognize that the corresponding compartment is now empty.

Optionally, at or before the rotation of the carousel, the controller will send a signal to the speaker 288, so that a tune, buzzer, music, or other audible sound will be produced at or before the dispensation. The audible sounds can include a sound frequency(ies) that are audible to an animal, such as a dog, but not to the human ear. The audible sound can alert the dog that a treat or toy will be available. Therefore a user can train the animal to come to the dispenser the animal hears a predetermined sound.

The controller has a volume control function to increase or decrease the volume of the sound played at the speaker based on the input from the volume knob 334. In some embodiments, when the volume knob 334 is turned clockwise the controller increases the volume at the speaker. When the volume knob 334 is turned counterclockwise the controller decreases the volume at the speaker. In some embodiments, a potentiometer is used vary the volume signal provided to the speaker.

Next the controller will move to step 346 and check its memory to determine whether any of the compartments are noted has having an dispensable item, if not the dispenser is empty and the controller will proceed to step 348 and exit the dispense function. In some embodiments, the controller will know that the dispenser is empty by counting the number of dispensations that have occurred since the dispense function began and then comparing that to the total number of loaded dispensable items to determine whether the dispenser is empty. If the dispenser is not empty, the controller will proceed to step 340, to repeat the waiting and dispensing according to the programmed schedule until the dispenser is empty.

Figure 20:
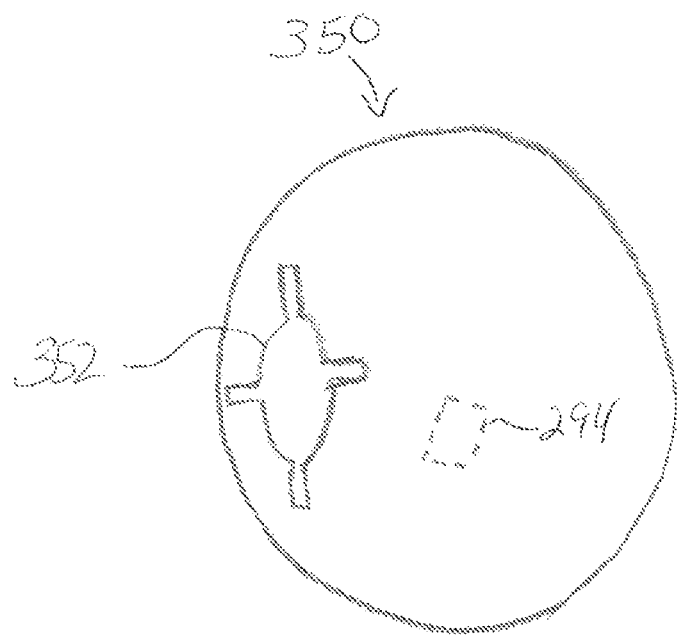
FIG. 20 is a dispensable item having an embedded tag.

FIG. 20 shows an example of one type of dispensable item 350 in the form of a squeezable rubber dog toy. The dispensable item is embedded with the RFID tag 294. In some embodiments, the dispensable item 350 is a treat or food holding device. In this way the dispenser can not only dispense toys but can dispense treats and food as well. Some types of dispensable items are both an animal toy and a treat or food holding device. For example, food or a treat can be wedged in the opening 352 of the toy 350, so that it is a treat/food holding device.

Figure 21:
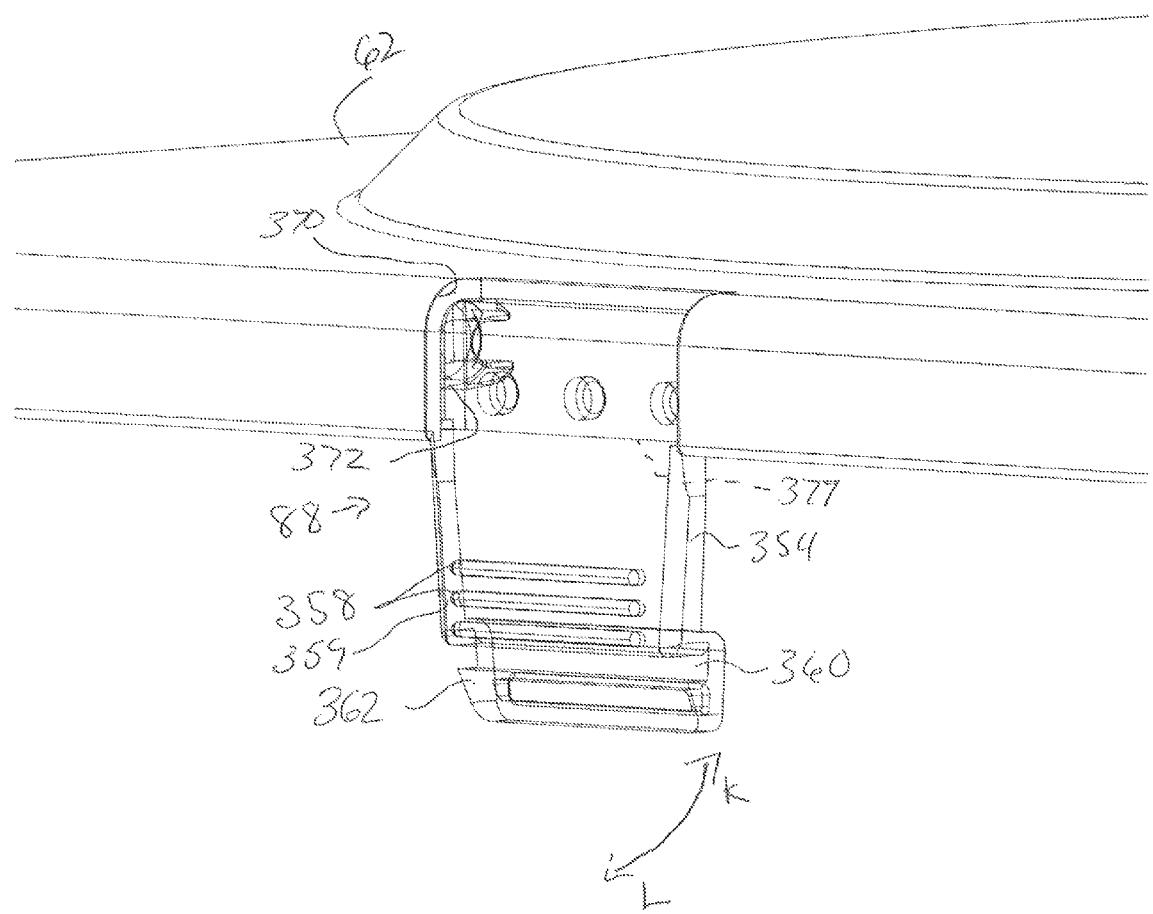
FIG. 21 is a perspective side view of a cover and a latch of the dispenser of FIG. 1, with the latch shown transparently.
Figure 22:
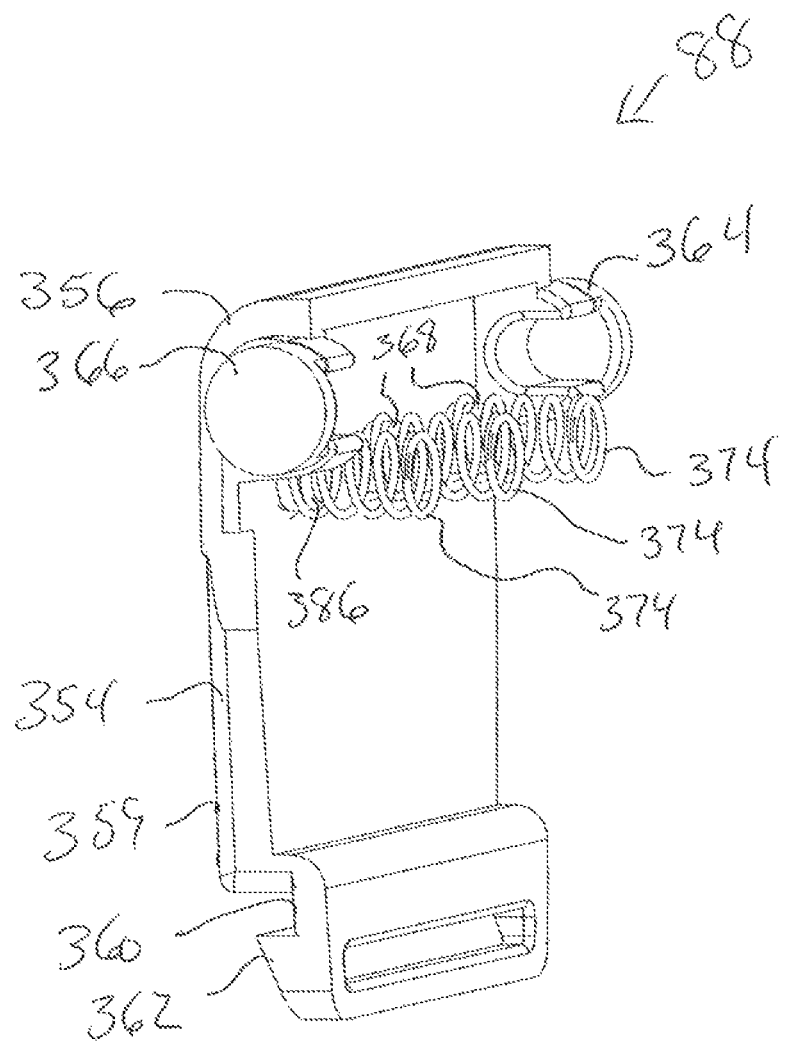
FIG. 22 is a rear perspective view of the latch of FIG. 21.

FIGS. 21-22 show the cover latch 88. The latch has a body 354. The body has an upper portion 356 a push area 359, three friction bars 358 in the push area 359, a recess groove 360, and a lower lip 362. At the upper end, the latch has pivot stubs 364, 366 extending laterally beyond the body. Three spring stubs 368 are located on the back of the body below the midline of the pivot stubs.

Figure 23:
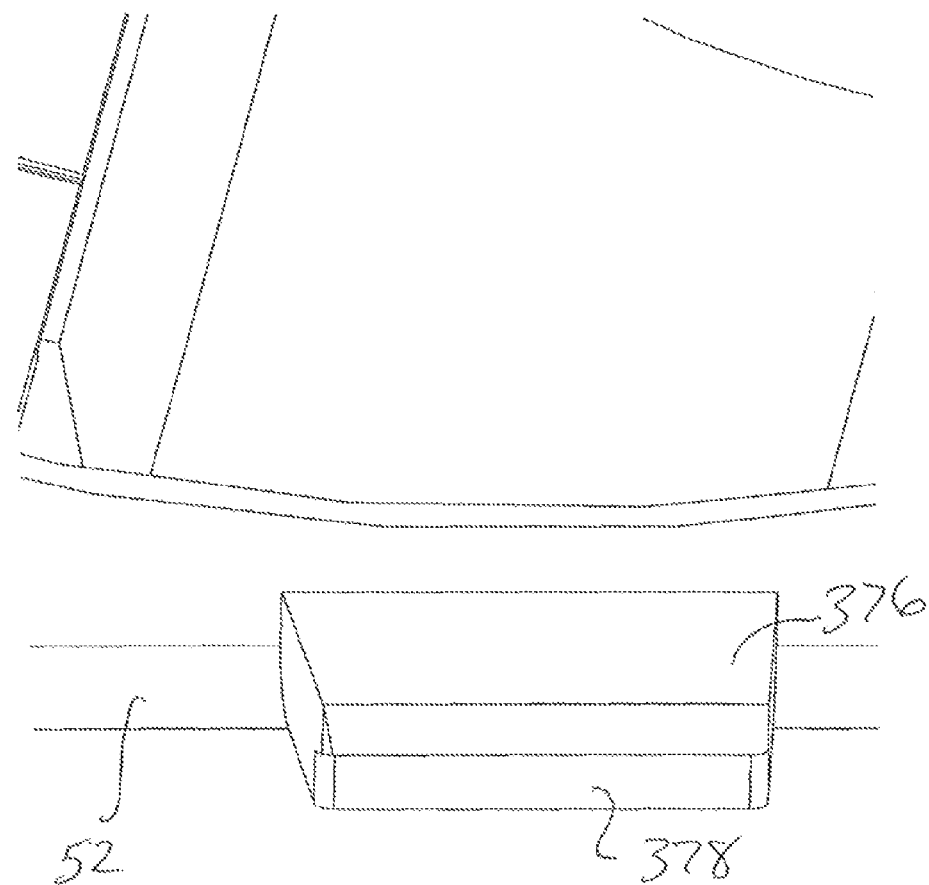
FIG. 23 is a perspective view of a latch opening of the housing of dispenser of FIG. 1.

Referring to FIG. 23, the latch 88 is received in a latch opening 376 of the right edge of the housing 52. The pivot stubs are received in pivot hubs 372 (right/upper pivot hub not shown). The latch 88 pivots about the pivot stubs in the pivot hubs between a retracted position, in the direction K of FIG. 21, and a home position, in the direction L. Three spiral compression springs 374 are mounted on the spring stubs 386. The springs engaged a plate 377 of the housing 52 so that the springs bias the latch toward the home position in the direction L.

As the latch moves toward the latch receiving opening 376 of the housing, the lower lip engages a ledge 378 of the opening 376 and drives the latch 88 back in the K direction. When the ledge 378 meets the recess groove the latch 88 springs forward to the home position locking the latch and the cover to the housing 52. The latch is release by a user pressing on the push area 359 and overcoming the spring bias. This drives the groove 360 back from the ledge 378 until the lower lip is removed from behind the ledge and can be move upward out of the latch opening 376. Then the cover can move upwards and way from the housing.

Referring to FIG. 7, as each of the hinges 84, 85 have a movable pin 380, 382 that is spring biased in direction M and N respectively. The pin can be drawn in the opposite direction against the bias to retract the pin into the hinge by moving levers 384, 386 in such direction. The levers 384, 386 are movable within lever openings 388, 390 which determine the range of motion of the pins. Therefore, the pins 380, 382 to can be withdrawn into the hinges 84,85 and out of the hinge openings 80, 82 of the cover, so that the cover can quickly and easily be removed by the user.

From the foregoing, it will be observed that numerous variations and modifications may be effected without departing from the spirit and scope of the invention. It is to be understood that no limitation with respect to the specific apparatus illustrated herein is intended or should be inferred.

We claim:

1. A method of loading an animal toy dispenser, comprising the steps of:
   detecting with an electronic tag reader whether an authorized animal toy is located within a first compartment, of a dispensing wheel of an animal toy dispenser, adjacent the electronic tag reader;
   advancing the dispensing wheel so that a next compartment of the dispensing wheel is positioned at a load location if the electronic tag reader detects an authorized code from an electronic tag of an animal toy within the first compartment.

2. The method of claim 1, wherein the step of detecting is further defined in that the electronic tag reader uses wireless and contact-less communication to detect the electronic tag of the animal toy.

3. The method of claim 1, comprising the step of repeating the steps of detecting and advancing for each successive compartment of the dispensing wheel until each compartment of the dispensing wheel contains an electronic tag of an animal toy having an authorized code.

4. The method of claim 1, wherein the step of detecting is further defined in that detecting only occurs if a load door of the first compartment is closed.

5. The method of claim 1, wherein the step of detecting comprises the step of rotating the dispensing wheel until the first compartment is located at the loading location.

6. The method of claim 1, wherein the step of advancing comprises the step of rotating the dispensing wheel until a next compartment of the dispensing wheel is positioned at a load location.

7. The method of claim 1, wherein the step of advancing is further defined in that an electronic motor rotates the dispensing wheel.

* * * * *